United States Patent

Sasse

[11] Patent Number: 6,047,806
[45] Date of Patent: Apr. 11, 2000

[54] HYDRODYNAMIC TORQUE CONVERTER WITH DEPRESSIONS IN THE EXTENSION AREA OF THE FRICTION LININGS

[75] Inventor: Christoph Sasse, Schweinfurt, Germany

[73] Assignee: Mannesmann Sachs AG, Schweinfurt, Germany

[21] Appl. No.: 09/073,232

[22] Filed: May 5, 1998

[30] Foreign Application Priority Data

May 16, 1997 [DE] Germany .............................. 197 20 575

[51] Int. Cl.$^7$ .............................. F16D 13/60; F16D 33/00
[52] U.S. Cl. ...................................... 192/113.36; 192/3.29
[58] Field of Search ............................... 192/113.36, 3.29, 192/3.28

[56] References Cited

U.S. PATENT DOCUMENTS

| | | | |
|---|---|---|---|
| 3,025,686 | 3/1962 | Lewis | 192/113.36 X |
| 4,027,758 | 6/1977 | Gustavsson et al. | 192/113.36 |
| 5,056,631 | 10/1991 | Macdonald | 192/113.36 X |
| 5,209,330 | 5/1993 | Macdonald | 192/3.29 |

FOREIGN PATENT DOCUMENTS

| | | | |
|---|---|---|---|
| 4338072 | 10/1994 | Germany | 192/113.36 |
| 59-9356 | 1/1984 | Japan . | |

*Primary Examiner*—Charles A Marmor
*Assistant Examiner*—Roger Pang
*Attorney, Agent, or Firm*—Cohen, Pontani, Lieberman & Pavane

[57] ABSTRACT

A lock-up clutch-for a hydrodynamic torque converter has a piston connectable to a converter housing through at least one friction lining and the piston is capable of a deflection movement in the axial direction. In the friction lining and in one of the piston or the converter housing, at least one depression is embodied for the passage of hydraulic fluid from the converter circuit. Associated with at least one of these depressions is an inflow and outflow, the former opening radially outside into the converter circuit and the latter opening radially inside into a chamber between the converter housing and the piston. The inflow depression and the outflow depression are both provided in one converter components, while a passageway depression is active in the adjacent converter component. The inflow or outflow depression runs, starting from the outer or inner circumference of the friction lining, at least into the extension area of the passageway depression, so that at least one fluid connection is established between the inflow and outflow depression and a passageway depression.

6 Claims, 6 Drawing Sheets

HYDRODYNAMIC TORQUE CONVERTER WITH DEPRESSIONS IN THE EXTENSION AREA OF THE FRICTION LININGS

BACKGROUND OF THE INVENTION

1. Field of the Invention

The invention relates to a lock-up clutch for a hydrodynamic torque converter which comprises a piston connectable to the converter housing through at least one friction lining and deflectable in the axial direction, wherein the interface between the friction lining and at least one of the converter housing and piston allows the passage of hydraulic fluid from the converter circuit for component cooling.

2. Description of the Prior Art

Figure 3:
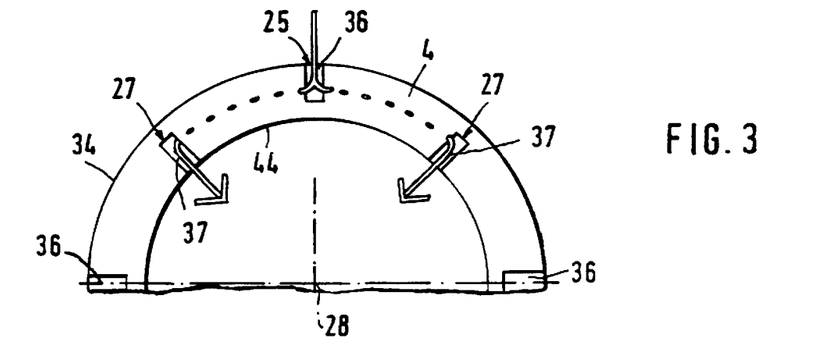
FIG. 3 is a sectional view of the friction linings along line III—III in FIG. 2.

A prior art hydrodynamic torque converter with a lock-up clutch is disclosed in German reference DE 44 23 640 A1. FIG. 3 of that reference shows a piston connectable to the converter housing through a friction lining and capable of a deflection movement in the axial direction. Other Figs. of the same document indicate that a depression for the passage of hydraulic fluid from the converter circuit may be arranged on the friction lining as well as in the one or more converter component(s) interacting therewith, such as a converter housing. Associated with the depression is an inflow or outflow, the former opening radially outside into the converter circuit and the latter opening radially inside into a chamber located between the converter housing and the piston.

In one embodiment shown in the prior art reference, the depressions run radially from the outside to the inside, so that hydraulic fluid flows very quickly through these depressions and creates a correspondingly low heat exchange with the converter components accommodating them. The depressions may also be very complex in form. In the latter case, the depressions can be manufactured only at high cost and material expenditure and are thus basically ruled out for series converters, in which simplicity and low cost are of essential significance.

One method of removing material from the area of the subsequent depression is stamping, for example. According to present-day stamping techniques, the friction lining is divided into individual segments. As result, during the subsequent assembly of these segments and their insertion onto the piston, inaccurate positioning of the segments is possible and may result in an unwanted change in the depression geometry.

This problem does not exist when an embossing process is used. However, the depth of the depressions that are manufactured using this method is relatively slight. Deviations from the target depth have considerable influence on the flow amount and thus on the heat extraction capacity.

Regardless of whether the depressions are manufactured by embossing or stamping, a setting of the lining occurs during operation, reducing the depth of the depressions. As a result, the flow resistance changes, so that, in turn, the requisite cooling is not guaranteed.

According to another prior art reference, DE 44 32 624 C1, depressions are embodied in the friction lining, whereby a zig-zag-shaped through channel for hydraulic fluid runs circumferentially and is associated with inflow or outflow depressions, which are located at predeterminable distances in the circumferential direction. Although a friction lining of this type may have desirable cooling properties, it is often impossible, for reasons of production technology, to precisely maintain the geometry and/or depth of its depressions. As a result, unwanted fluctuations occur in the volume flow passing through the depressions, so that the maximum friction surface temperature demanded by the customer cannot be guaranteed with sufficient reliability. If the maximum friction surface temperatures are exceeded, the friction lining may be destroyed by overheating.

Another prior art device is disclosed in EP 0 407 895 A2 that includes depressions for the passage of hydraulic fluid in the extension area of a friction lining. In some embodiments, these depressions are provided in the friction linings; in others, in the piston of the lock-up clutch. The depressions run around the circumference in circular fashion and are interrupted by radial depressions arranged at predeterminable angular distances from each other. A portion of these depressions acts as the outflow for hydraulic fluid and another portion acts as the inflow.

In the aforementioned prior art documents, the inflow and outflow depressions as well as the passageway depressions are always embodied on the same component, such, for example, as the friction lining or the piston of a lock-up clutch. For this reason, the production of these depressions is also linked to the problem of imprecise manufacture.

A further embodiment of a depression in a converter component is disclosed in FIG. 9b of U.S. Pat. No. 5,248,016. In this device, flow-regulating holes are provided in the piston of a lock-up clutch on the side of the piston that faces the converter circuit. These flow-regulating holes pass into channels embodied on the piston on the side of the piston that faces a friction lining.

In this embodiment of depressions, the flow-through amount is determined by the diameter of the flow-regulating opening, not by technical manufacturing inaccuracies in the depression. However, the depressions disclosed in the aforementioned patent are either embodied in such a way that hydraulic fluid flows through them too quickly for adequate heat exchange, or else are very expensive with respect to design.

SUMMARY OF THE INVENTION

The object of the invention is to embody the friction area of the bridge clutch on a hydrodynamic torque converter in such a way that an optimal supply of hydraulic fluid is provided to cool converter components, or a lamella arranged between the converter housing and the piston, with minimum constructive expense and technical production risk.

This object is attained according to the invention by embodying both the inflow depression and the outflow depression on one converter component, and the passageway depression on the adjacent converter component, and bringing the two depression parts into fluid connection with each other. The two depressions, in interaction with each other, therefore achieve as advantageous an effect as would a single depression composed of an inflow, passageway and outflow depression, but do not have the expensive design of the latter. Instead, a very simple structure is conceivable, in which the inflow and outflow depressions embodied in one of the converter components preferably run substantially radially, so as to ensure a fast inflow of hydraulic fluid from the converter circuit or a fast outflow of this hydraulic fluid, while the passageway depression acting between the inflow and outflow depressions preferably extends in the circumferential direction, so as to keep the hydraulic fluid that has penetrated through the inflow depression in the effective area of the friction surface for as long as possible and thus ensure effective cooling of the components associated with this friction surface.

According to one of the claims, an advantageous design for a passageway depression of this type calls for the passageway depression to have one course component substantially in the circumferential direction. In this embodiment, a simple depression is produced in each of the components forming part of the friction surface. The passageway depression should preferably be embodied on metal parts, such as the converter housing and/or the piston of the bridge clutch, because an appropriate depression can be created at the same time that these parts undergo deformation. The friction lining for these converter components can therefore be embodied with a very simple depression form, such as the purely radial inflow and outflow depressions. If these depressions project radially from their respective starting areas past the associated passageway depression, then the necessary fluid connection between the two depressions is ensured at all times, even if there tolerance fluctuations. Depressions embodied in such a simple manner logically present no great technical manufacturing obstacles, so that sufficient precision to guarantee that a maximum temperature will not be exceeded on the parts associated with the friction surface is attained.

Of course, the inflow and outflow depressions may also be embodied in the metal converter components, while the friction lining may comprise at least one passageway depression.

As already noted, the passageway depression is preferably embodied on a metal converter component, such as the converter housing or the piston of the bridge clutch. The high heat conductivity of the material of these converter components allows a very good cooling effect to be achieved. The passageway depression, with respect to its cross-section, is made as large as possible, so as to keep the flow-through resistance low. The flow-through resistance is then determined by the cross-sectional size of the inflow or outflow depression embodied in the friction lining. As a result, inaccuracies in the production process during the deep drawing of the passageway depression are insignificant.

When a lamella is used between the converter housing and the piston of the bridge clutch as the support for two friction linings, it is advantageous, in terms of production technology, to provide a passageway depression on each friction lining and to arrange the two depressions, seen in the circumferential direction, at a predeterminable angular distance from each other. In such cases, according to one of the claims, it is advantageous to provide a flow-regulating connection between the two passageway depressions, whereby the diameter of the flow-regulating connection establishes the amount of flow in the passageway depressions, so that tolerance problems resulting from manufacture become less noticeable. Moreover, there is better utilization of the hydraulic fluid flowing through the depressions, because the fluid first cools the friction lining on one side of the lamella, then cools the lining on the opposite side of the lamella and then, specifically, cools the converter component interacting with the lining, such as the converter housing or the piston of the lock-up clutch.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings.

In the drawings, wherein like reference characters denote similar elements throughout the several views.

DETAILED DESCRIPTION OF THE PRESENTLY PREFERRED EMBODIMENTS

Figure 1:
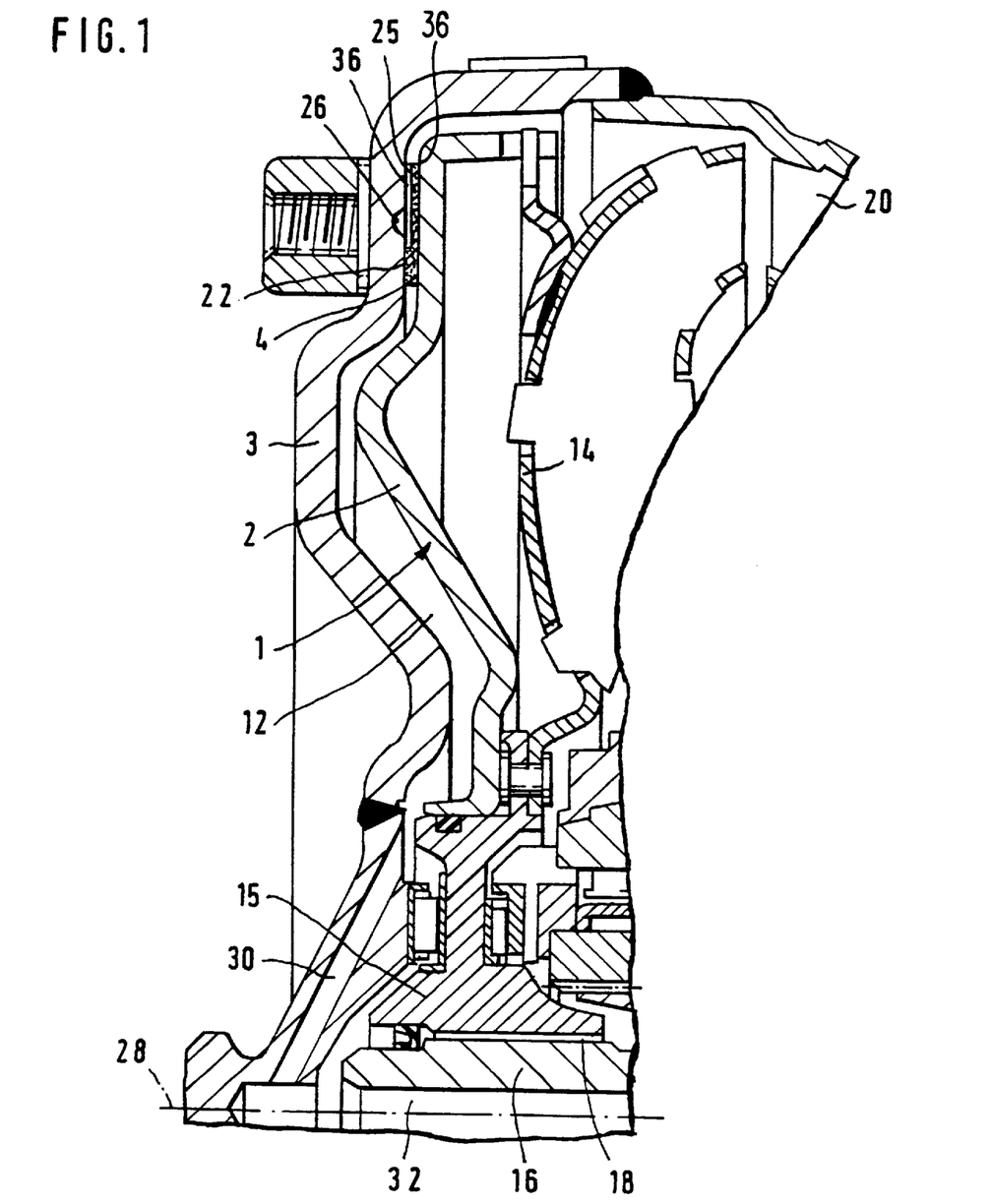
FIG. 1 is a partial sectional view of the upper half of a longitudinal section through a torque converter with a lock-up clutch whose piston comprises a friction lining with a depression facing the converter housing, whereby the converter housing also has a depression.

Referring to FIG. 1, a hydrodynamic torque converter includes a friction lining 4 for transmitting a torque from the converter housing 3 and a piston 2 of a lock-up clutch 1 to an output shaft 16. Torque converters of this type are known from the prior art, such as the aforementioned German reference DE 44 23 640 A1.

The radially outer area of the piston 2 has on its side facing the converter housing 3, a flat surface on which the friction lining 4 comes to rest. The piston 2 is connected in the circumferential direction to a toothed carrier ring, which in turn is attached to the turbine wheel 14. Under the influence of the hydraulic medium such, for example, as oil, conducted through the converter, the piston 2 is held at rest via the friction lining 4 on the converter housing 3. This configuration is maintained until, by reversal in the manner known from DE 44 23 640 A1, the pressure in a chamber 12 between the converter housing 3 and the piston 2 is exceeds that in the converter circuit. When the pressure is lower in chamber 12 than in the converter circuit, the piston 2 is in friction-locking connection with the converter housing 3. In this configuration, rotation of the converter housing 3 is transmitted via the friction lining 4 to the turbine wheel 14 and from there via the turbine hub 15 to an output shaft 16. The output shaft 16 is held in the turbine hub 15 in a rotation-proof manner by a toothing 18. When the pressure in chamber 12 exceeds the coverter circuit pressure by means of reversal, the piston 2 is separated from the converter housing 3. In this configuration, the drive movement of the converter housing 3 is conveyed via the pump wheel 20 with slip to the turbine wheel 14 and from there makes its way via the turbine hub 15 to the output shaft 16.

The piston 2 does not include a torsional vibration damper. It may therefore be necessary to control the pressure force of the piston 2 relative to the converter housing 3 such that if torsional vibrations are conveyed via the latter, slip occurs on the converter housing 3 between the friction lining 4 and the friction surface 22. The use of friction for vibrational damping increases the cooling requirement for the converter components, such as the converter housing 3 and the piston 2. For this reason, according to the invention, oil supplied through the converter is introduced radially outside on the friction lining 4 into depressions 25. After flowing through depressions 26, the oil is conducted out of the friction linings 4 through depressions 27 on the radial inner sides of the friction lining 4 and passes through the chamber 12 between the converter housing 3 and the piston 2. The oil further flows through borings 30 which lead radially inward to a rotational axis 28 of the torque converter. The oil flows back through a longitudinal boring 32 in the output shaft 16 into an oil supply container.

Figure 2:
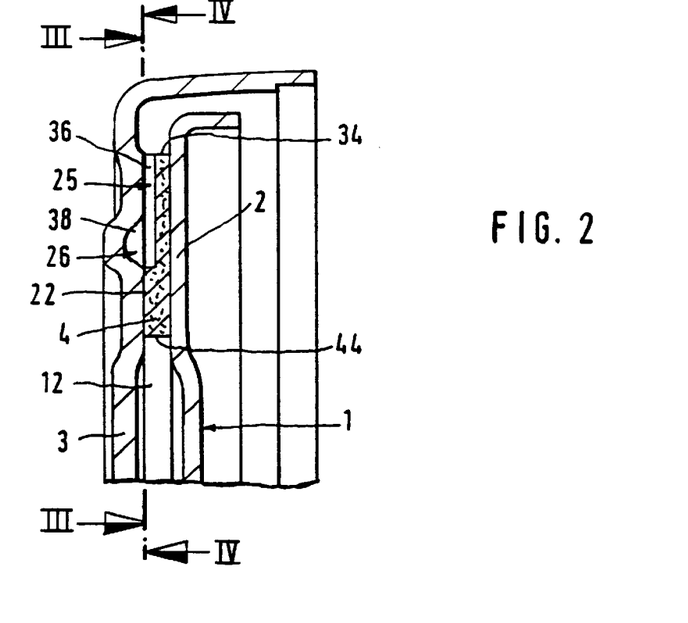
FIG. 2 is an enlarged detail of the extension area of the friction lining in FIG. 1.
Figure 4:
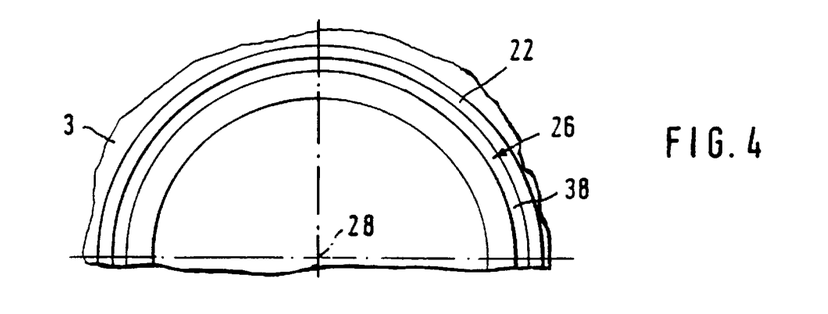
FIG. 4 is a sectional view of the converter housing along line IV—IV in FIG. 3, but in View B.

To attain the optimal possible cooling effect in the area of the friction lining 4, the invention proposes a course for the depressions 25 to 27 as shown, for example, for the friction lining 4 in FIGS. 2 to 5. Starting from the outer circumference 34 of this friction lining 4, respective depressions 25 are provided in the latter at predeterminable angular distances in the circumferential direction. The depression 25 is embodied as a radial groove 36 and acts as an inflow. For the sake of simplicity, this depression is therefore identified as the inflow depression 25. As FIG. 3 also shows, radial grooves 37 are provided on the inner circumference 44 of the friction lining 4 at predeterminable angular distances in the circumferential direction and act as outflows for hydraulic fluid. For the sake of simplicity, these depressions are identified as the outflow depressions 27. FIGS. 1, 2, and 4 show a depression 26 in the converter housing associated with these inflow and outflow depressions 25, 27. In FIG. 4, the depression 26 is a circumference-encircling ring groove 38 with a constant radius and is actively connected to both the inflow depressions 25 and the outflow depressions 27. The ring groove 38 thus forms a passageway depression 26 between the inflow depression 25 and the outflow depression 27.

To establish the required active connection between the inflow and outflow depressions 25, 27 and the passageway depression 26, the length of the inflow and outflow depressions 25, 27 is long enough so that they each have a common contact surface with the passageway depression 26. It is even better, however, for the inflow and outflow depressions 25, 27 to cross the passageway depression completely in the radial direction, because an adequate supply of hydraulic fluid to the passageway depression 26 is thus ensured.

When the lock-up clutch is closed such that the friction lining 4 rests on the friction surface 22 on the converter housing 3, hydraulic fluid of the converter circuit flows from the radially outer side of the inflow depression 25 and passes through the radially inner end of the inflow depression into the passageway depression 26. Because the adjacent outflow depressions 27 are arranged at a distance from the inflow depression 25 in the circumferential direction, the hydraulic fluid, in order to emerge radially inward from the friction linings 4, must use the passage depression 26 as a connection to the outflow depressions 27. This ensures that hydraulic fluid from the converter circuit entering via the inflow depression 25 remains in the extension area of the friction lining 4 long enough to transport away a sufficient amount of heat from the friction lining 22. As a result, cooling occurs on the converter housing 3, which has greater importance because the opposite side of the converter housing, even with heat insulation, is exposed to the ambient air. As soon as the hydraulic fluid has reached the adjacent outflow depressions 27, it flows radially inward and is conveyed from the converter circuit, in the manner already described, via the chamber 12, the borings 30 and the longitudinal boring 32 in the output shaft 16.

FIG. 3 schematically depicts the flow-through direction of the hydraulic fluid.

Figure 5:
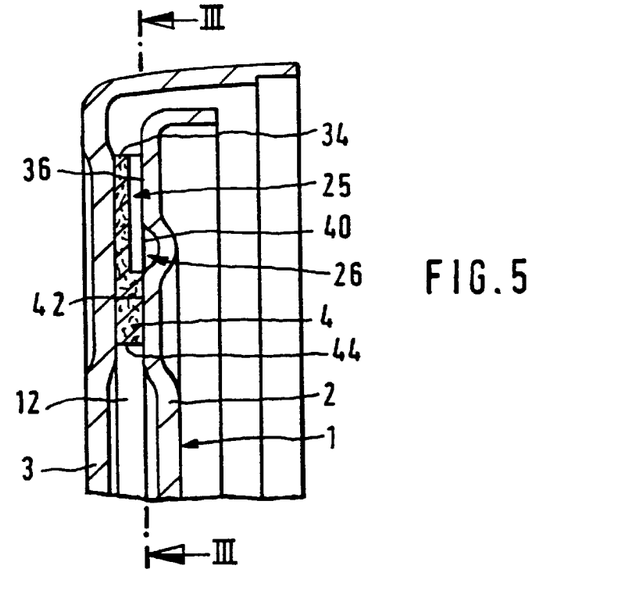
FIG. 5 is a detailed view of the extension area of the friction lining like FIG. 2, but with depressions embodied on the piston side.

FIG. 5 shows a friction lining 4 that is attached to the converter housing 3 instead of the piston 2. The friction surface 42 is therefore active between the friction lining 4 and the piston 2. As a result, the inflow depression 25 is embodied in the side of the piston 2 where, inside the extension area of the inflow depression 25, there is also a passageway depression 26 in the form of a ring groove 40. Intensive cooling of the piston 2 is thus possible, because the piston 2 is exposed on its counter side to the cooling influence of the hydraulic fluid from the converter circuit. In this embodiment, too, the hydraulic fluid, after entering the friction lining 4, runs on the outer circumference 34 into the circumferential ring groove 40 and is then distributed to the adjacent outflow depressions 27 to flow radially inward via the chamber 12.

Figure 6:
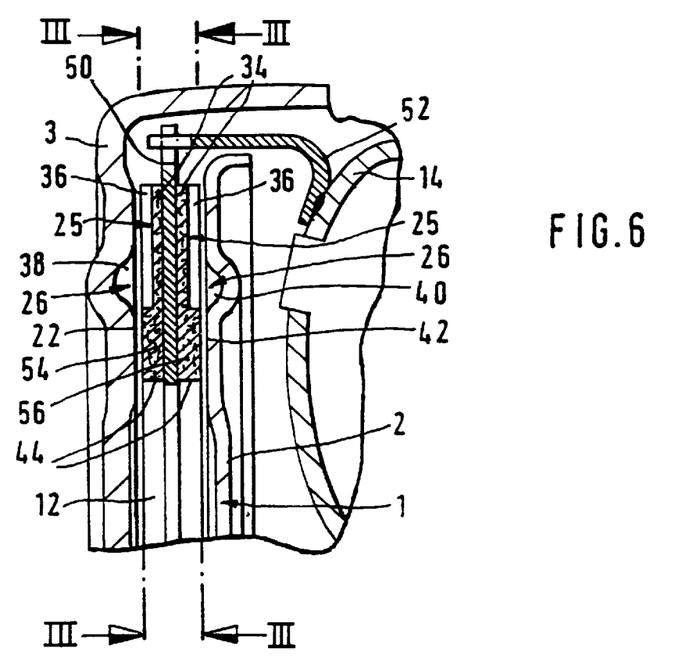
FIG. 6 shows a lock-up clutch of a torque converter with friction linings on both sides of a lamella arranged axially between the converter housing and the piston of the lock-up clutch.

FIG. 6 shows an embodiment in which a lamella 50 is provided axially between the piston 2 and the converter housing 3. The lamella 50 is attached in an axially movable but rotation-proof fashion via a carrier device 52 to the turbine wheel 14. The lamella 50 has a friction lining 54, 56 on each of its two axial sides. On the sides of the friction linings 54, 56 facing away from the lamella 50, inflow depressions 25 in the form of radial grooves 36 are formed. The radial grooves 36 lead radially inward and are attached to passageway depressions 26 that run in the circumferential direction in the form of ring grooves 38 and 40. The friction linings 54, 56 further comprise outflow depressions 27 (not visible in FIG. 6) located at a distance from the inflow depressions 25 in the circumferential direction. The hydraulic fluid flows from the outflow depressions 27 into the chamber 12. The outflow depressions 27, starting from the inner circumference 44 of the friction linings 54, 56, also extend radially outward and radially cover the ring grooves 38 and 40. An especially large friction surface 22, 42 is possible in this embodiment of the lock-up clutch 1 because of the double friction lining 54, 56, which allows the transmission of high torques. In addition to the increased torque, cooling of both the converter housing 3 and the piston 2 of the lock-up clutch 1 is cooled in the radial extension area of the friction linings 54, 56.

Figure 7:
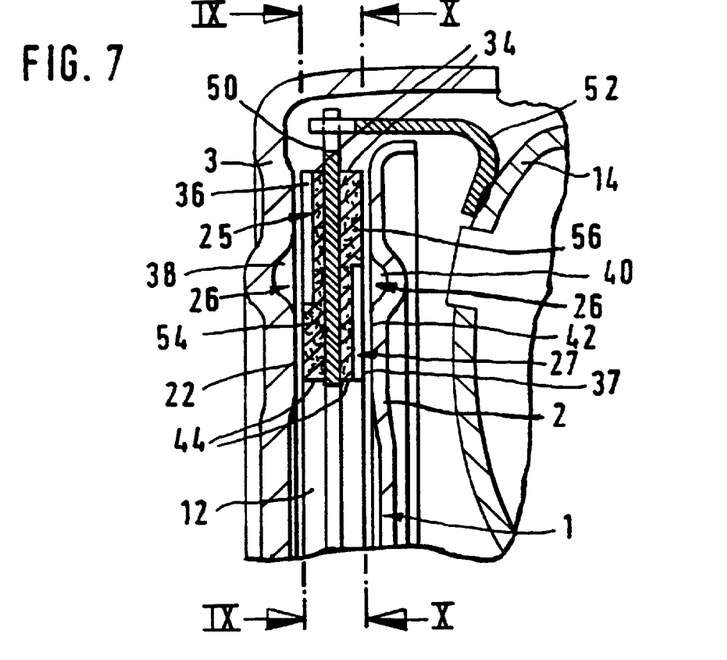
FIG. 7 shows a section of a lock-up clutch like that shown in FIG. 6, but with radially offset depressions in the friction linings.
Figure 8:
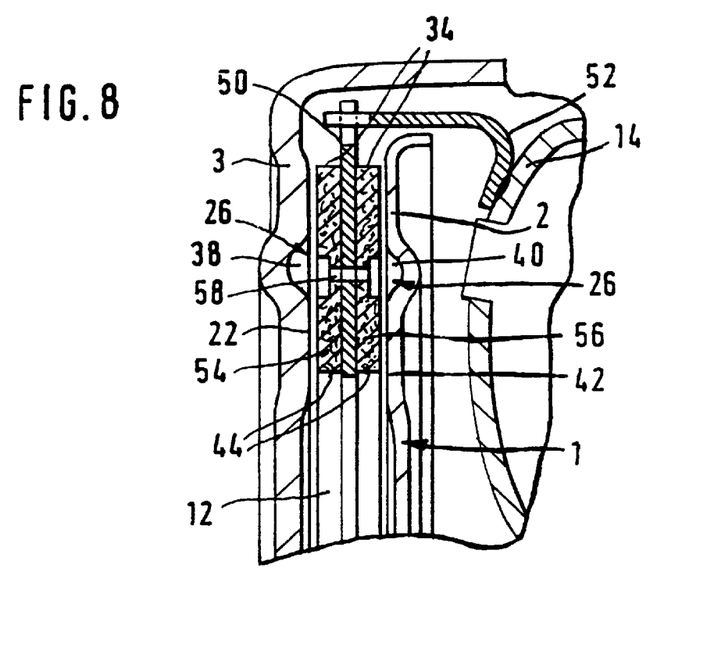
FIG. 8 shows a different section of the lock-up clutch of FIG. 7, with a flow-regulating opening through the lamella and friction linings.
Figure 9:
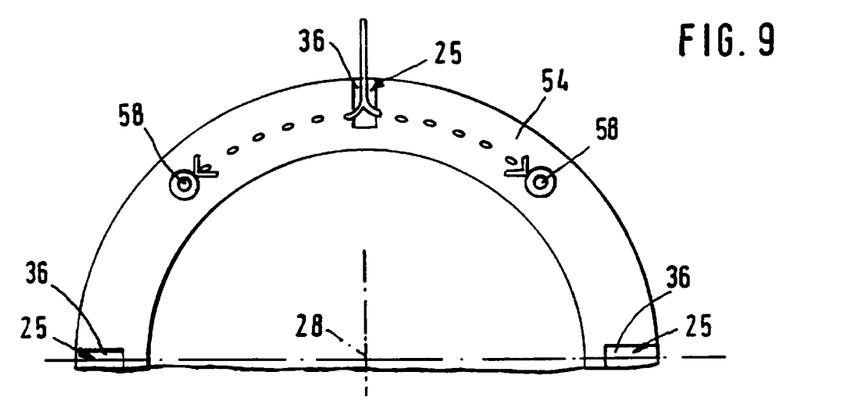
FIG. 9 is a sectional view of the friction lining along line IX—IX of FIG. 7.
Figure 10:
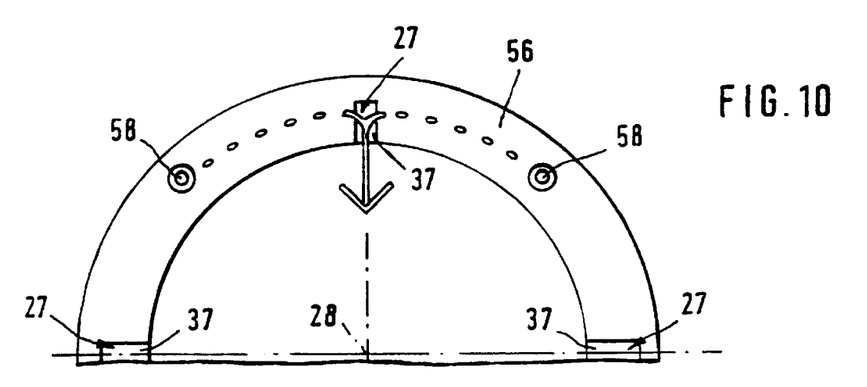
FIG. 10 is a sectional view of the friction lining along line X—X of FIG. 7.
Figure 11:
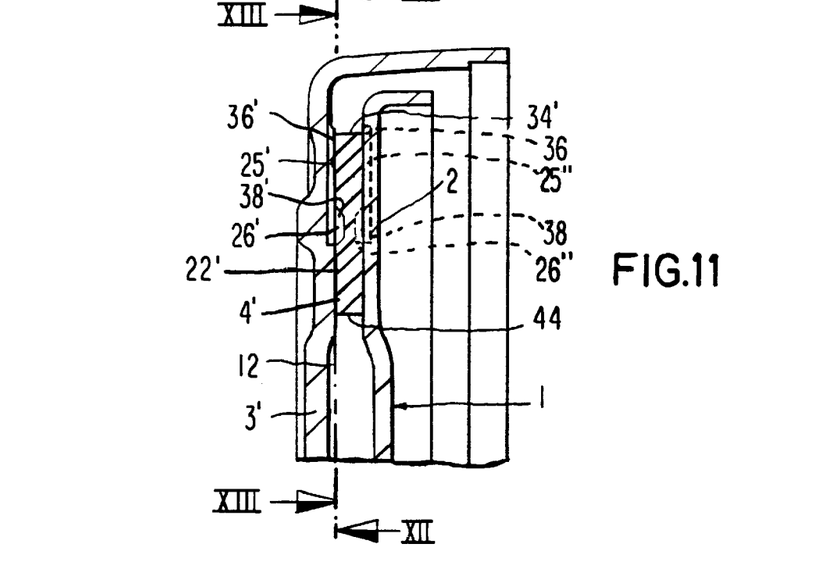
FIG. 11 is an enlarged detail of the extension area of the friction lining in FIG. 1 showing another embodiment.
Figure 12:
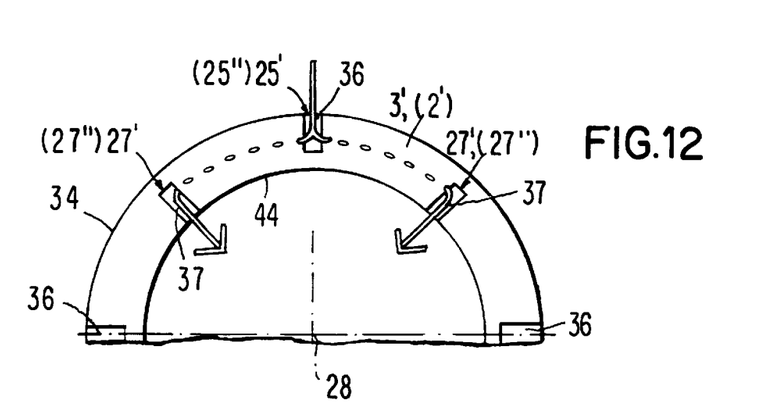
FIG. 12 is a sectional view of the friction linings along line XII—XII in FIG. 11.
Figure 13:
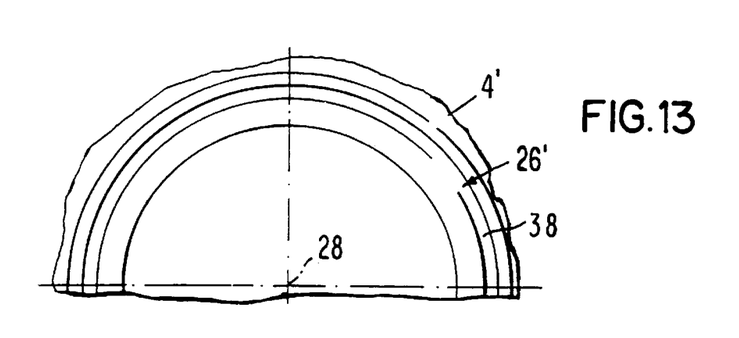
FIG. 13 is a sectional view of the friction linings along line XIII—XIII in FIG. 11.

FIG. 7 shows an inflow depression 25 in the friction lining 54 and an outflow depression 27 in the friction lining 56, relative to a circumferential sectional plane. This embodiment functions advantageously in conjunction with a flow-regulating connection 58, as shown in FIG. 8. Hydraulic fluid travels from the converter circuit via the inflow depression 25 into the left passageway depression 26 (in FIG. 7), then flows through the left passageway depression 26 and, before it can emerge radially inward into the chamber 12, is guided via the flow-regulating connection 58 shown in FIG. 8 to the other side of the lamella 50 and into the passageway connection 26 embodied on that side. After flowing through the passageway connection 26 onto at least one part of the circumference, the fluid exits the area of the friction linings 54, 56 through an adjacent one of the outflow depressions 27, passing radially inward into the chamber 12. In such an embodiment, the friction linings 54 and 56 are angularly offset by a predeterminable amount in the circumferential direction relative to their inflow depressions 25 and outflow depressions 27. The residence time of the hydraulic fluid in the passageway depressions 26 is high, as a result of which the absorption capacity for heat is improved in the area of the friction surfaces 22 and 42. FIGS. 9 and 10 again illustrate, with arrows, the course of the hydraulic fluid during its passage through the depressions 25 to 27 in the area of the friction surfaces 22 and 42 in the embodiment of FIGS. 7 and 8.

Because the flow-regulating connection 58 acts as a bottleneck in the overall flow path, its diameter determines the flow resistance within the depressions 25 to 27, so that irregularities caused by tolerance and wear do not negatively impact the depressions with respect to the conveyable amount of hydraulic fluid.

Instead of the embodiments shown in FIGS. 1 to 10, it is also conceivable to arrange the respective passageway depressions 26 in the form of ring grooves in the friction linings 54, 56 and to arange the substantially radial inflow depressions 25 as well as the radial outflow depressions 27 in the piston 2 and/or the converter housing 3. The simplicity of the overall structure does not change. An example of this embodiment is shown in FIGS. 11–14. These drawings show that inflow depressions 25' and outflow depressions 27' are arranged on the converter housing 3' and the passageway depressions 26' are arranged on friction lining 4. The drawings also show that the inflow depressions 25" and outflow depressions 27" may optionally be arranged on the piston 2' instead of the converter housing 3'. These optional arrangements may be applied to any of the embodiments shown in FIGS. 1 to 10.

The invention is not limited by the embodiments described above which are presented as examples only but can be modified in various ways within the scope of protection deemed by the appended patent claims.

I claim:

1. A lock-up clutch for a hydrodynamic torque converter having a torque converter housing and an axis of rotation, said lock-up clutch comprising:

an axially movable piston;

a friction device comprising at least a friction lining mounted between said axially movable piston and said converter housing, said friction lining comprising one of a first depression and a second depression and one of said piston and said converter housing comprising the other of said one of a first depression and a second depression, wherein said first and second depression allow the passage of a hydraulic fluid from an area radially outside of said friction lining to an area radially inside of said friction lining;

said first depression comprising an inflow depression and an outflow depression running radially from the outer circumference and inner circumference of the friction lining, respectively, said inflow depression being separated from said outflow depression; and said second depression comprising a first passageway depression running circumferentially, said inflow and outflow depressions extending over said first passageway depression, thereby ensuring a fluid flow connection between said inflow depression and said outflow depression via said second depression, wherein said second depression further comprises a second passageway depression separate from said first passageway depression and located on the axially opposing side of said friction device from said first passageway depression, wherein said first and second passageway depressions are connected to each other by at least one flow-regulating connection through said friction device.

2. The lock-up clutch of claim 1, wherein said inflow depressions are offset from said outflow depressions by a predetermined amount in the circumferential direction.

3. The lock-up clutch of claim 2, wherein said inflow and outflow depressions each comprise at least one radially directed course component.

4. The lock-up clutch of claim 1, wherein said first and second passageway depressions comprise a substantially circumferentially directed course component.

5. The lock-up clutch of claim 1, wherein said inflow and outflow depressions are arranged on said piston and converter housing and said first and second passageway depressions are arranged on respective sides of said friction lining that face said piston and converter housing.

6. The lock-up clutch of claim 1, wherein said inflow and outflow depressions are arranged on each side of said friction lining respectively facing said first and second passageway depressions, said first passageway depression is arranged on said one of said piston and the converter housing and said second passageway depression is arranged on the other of said piston and converter housing.

* * * * *